United States Patent
Harmon et al.

(10) Patent No.: US 7,351,576 B1
(45) Date of Patent: Apr. 1, 2008

(54) COMPOST TEA MACHINE

(75) Inventors: Michael Todd Harmon, Canby, OR (US); Elaine Ruth Ingham, Corvallis, OR (US); Bradley Steven Glaze, Lyons, OR (US); Kenneth Roy Warner, Canby, OR (US)

(73) Assignee: Michael T. Harmon, Canby, OR (US)

( * ) Notice: Subject to any disclaimer, the term of this patent is extended or adjusted under 35 U.S.C. 154(b) by 733 days.

(21) Appl. No.: 10/813,961

(22) Filed: Mar. 26, 2004

(51) Int. Cl.
*C12M 1/04* (2006.01)

(52) U.S. Cl. .................. 435/296.1; 366/101; 366/107; 261/122.2; 99/323.1

(58) Field of Classification Search ............ 435/296.1; 366/101, 107; 261/122.2; 99/323.1
See application file for complete search history.

(56) References Cited

U.S. PATENT DOCUMENTS

| | | | | |
|---|---|---|---|---|
| 4,157,922 A | * | 6/1979 | Luik ........................ | 134/58 R |
| 6,063,618 A | * | 5/2000 | Weuster-Botz et al. .. | 435/294.1 |
| 6,168,949 B1 | * | 1/2001 | Rubenberger ............ | 435/295.1 |
| 6,649,405 B2 | * | 11/2003 | Alms et al. .............. | 435/296.1 |
| 2002/0108498 A1 | * | 8/2002 | Huhn ........................ | 99/279 |
| 2003/0113908 A1 | * | 6/2003 | Hussey et al. ........... | 435/296.1 |

OTHER PUBLICATIONS

Dr. Elaine R. Ingham, The Compost Tea Brewing Manual Mar. 2003, 47 and 48, Fourth Edition, Soil Foodweb Inc., Corvallis, Or., no date provided.

* cited by examiner

*Primary Examiner*—William H. Beisner

(57) ABSTRACT

The invention relates to an in home apparatus for simultaneously suspending, aerating, agitating, extracting and entraining a compost water nutrient culture. A beaker contains the compost nutrient water culture. A perforated elastic membrane transversely covers the open beaker bottom and is retained and compression sealed by a holder. The holder mates with a recess provided by upper portions of a base. The base contains a diaphragm air pump supplying air through the perforated elastic membrane releasing air bubbles into the compost, water nutrient culture in the beaker. Pulsating air supply from the diaphragm air pump vibrates the perforated elastic membrane which in combination with the sparging of air bubbles suspends the compost nutrient water culture preparing a high quality compost tea. The beaker, holder, and base easily engage and disengage for the proper cleaning and convenient in home preparation of compost tea.

11 Claims, 4 Drawing Sheets

COMPOST TEA MACHINE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to compost tea as a water extract of compost, more specifically an in home mechanism and methods for the brewing of compost tea as an aerobic water extract of compost.

2. Discussion of Prior Art

Our agricultural community increasingly appreciates the benefit of crops produced on a sustainable basis without the use of damaging chemicals. As the recognized disadvantages of chemical fertilizers, fumigants, pesticides and herbicides become more evident, compost teas are rapidly emerging as a sustainable, economic, organic, alternative. Compost tea is an aerobic water extract of compost that is cold brewed. Compost tea is applied to crops or plants by foliar spray or soil drench. Unique to the brewing of compost teas is the need to supply enough energy to extract beneficial microorganisms which adhere to compost particles without destroying the microorganism itself. The extracted microorganisms are given nutrients and proper oxygen levels which result in an increase in the number and activity of the beneficial species. Species diversity may be as high as 25,000 to 500,000 species in a gram of compost tea. Beneficial microorganisms control disease by competing for foods, space, and infectious sites on the plant. Also beneficial predators consume diseases as another mechanism to prevent pathogen growth. The greater the diversity of aerobic beneficial microorganisms, the more likely that disease-causing organisms will be out competed on leaves, stems, roots, or in the soil. Beneficial microorganisms promote nutrient cycling. For example, bacteria and fungi immobilize nutrients in their biomass, and the protozoa and nematodes consume and release the nutrients from the bacterial and fungi and return them to plant available forms, promoting plant growth. Beneficial organisms also improve nutrient levels, build soil structure, and remove toxins. Every chemical-based pesticide, fumigant, herbicide and fertilizer tested harms or out right kills some part of the beneficial life that exists in soil. Properly prepared compost teas restore soil biology killed or damaged by chemicals. Testing compost teas using direct microscopic methods provides meaningful, repeatable results measuring the microbial life available to plants.

The brewing of compost tea is distinguished from all other fermentation processes in three ways. First, compost tea requires the extraction of adhered microorganisms. Energy supplied by a brewing mechanism breaks adhesions between the microorganism and its host, compost, without destroying the microorganisms. In contrast, all other known fermentation processes inoculate with bacterium. Second, compost tea extractions produce a species diversity as high as 500,000 species in a gram of compost tea. In contrast, all other known fermentation processes utilize a single bacteria specie or in some cases a few selected or preferred bacteria specie as provided by inoculate. Third, compost teas select for aerobic microorganisms by maintaining at least 6 mg/liter oxygen. Properly prepared composts contain very few anaerobic microorganisms. Any anaerobic microorganisms present do not reproduce in oxygen levels above 6 mg/liter in compost tea. In contrast, all other known fermentation processes do not select for aerobic or anaerobic microorganisms but rather start with a known bacterium.

Compost tea bucket methods began in Roman, Greek, and Egyptian times (Brehaut, 1933 Cato's De Agriculture). Modern versions of "compost in a bucket are still used today. Typically compost is either free in the bucket or suspended in a sack or bag in a bucket. Water is then added and the slurry stirred periodically adding a small amount of air. The brewing time usually requires several weeks in order to extract any of the organisms from the compost. After brewing, the slurry is strained and applied to the crop. With this method only a few organisms will be extracted and reproduce due to the lack of available food sources in mature compost, and the ability of bacteria to use oxygen more rapidly than it can be replaced by stirring the slurry.

As the benefits and economics of compost tea became apparent more efficient Compost tea making devices were developed. The Soil Soup Bio-Blender@www.soilsoup.com is designed to stir and aerate a water nutrient solution producing compost tea. In this method compost is contained in a felt bag. The felt bag is then partially submerged into a tank containing an aerated water nutrient solution. Bacterial and fungal extraction depends upon the ability of the aerated moving water to penetrate into the felt bag, extract the bacteria and fungi from the compost, transfer them back through the felt bag, and into the nutrient solution. The felt bag greatly restricts interaction between the aerated moving water and the compost inhibiting the extraction of microorganisms, especially in compost centrally located within the felt bag. The felt bag becomes anaerobic if not very carefully cleaned producing contaminated conditions in the next batch of tea. While producing higher quantities of microorganisms than earlier methods, published tests show a relatively low number of bacterial and fungal microbes brewed by the Bio-Blender. (Ingham, 2003 "The Compost Tea Brewing Manual").

The Bio-reactor is described in U.S. Pat. No. 6,168,949. This device pumps water from the bottom of tank up to the top of the tank then through an air atomizing nozzle into a vortex chamber to interact with compost. While sprayers enhance extraction and circulation improves aeration, the same problems still exist, restricted interaction between contained compost and the aerated water nutrient solution. Extensive plumbing within this brewer requires time consuming cleaning to prevent anaerobic conditions. The pump recirculating system in combination with the right angle plumbing is known to reduce the number of microorganisms. Published test results were better than the Bio-Blender, however, they were still far below the known potential for compost tea brewers. (Ingham, 2003, "The Compost Tea Brewers Manual").

The Compost Tea System, U.S. patent application Ser. No. 09/847,893 uses a water holding tank to contain process water. Air diffusers are positioned near the bottom of the holding tank and sparge directly up toward compost contained in finely perforated baskets. Again the same problem exists, the restricted interaction between the contained compost and the aerated water nutrient solution which inhibits the release of microorganisms. This device is known to produce reduced oxygen levels (below 6 mg of oxygen per liter) in lower tank portions. Cleaning may be difficult around air diffusers. Published test results show good bacterial extraction but poor fungal extraction.(Ingham, 2003, "The Compost Tea Brewers Manual").

More recently several machines have appeared on the market. EMP Earth Tea Brewers@ www.composttea.com Simplici-tea@www.simplici-tea.com (patent pending) Alaska Giant@www.alaskagiant.com. Ecology brewer, E-mail: info@ecology-enterprise.com (patent pending). (Ingham, 2003, "The Compost Tea Brewers Manual"). None of these are patented machines and they all follow the same pattern of compost in a basket with various methods of supplying air to extract and multiply microorganisms. None of these would perform suitably in ones living quarters.

Modern compost tea brewers demonstrate improvement over older bucket methods, however, all known compost tea brewers suffer from a number of disadvantages.

(A) The inability to maintain aerobic conditions (above 6 mg oxygen per Liter). Dead zones within compacted compost tea baskets or bags, and areas of poor circulation in the water nutrient tank lead to anaerobic problems.

(B) The inability to extract microorganisms from the compost. Many machines do not supply enough energy to extract adhered microorganisms from compost surfaces. Typically, energy is supplied in the form of an aerated nutrient water culture which must penetrate the fine perforations of a bag or basket filled with compost, extract the adhered microorganisms from the compost, transfer them back through the bag or basket, and into the nutrient solution all without damaging fragile cell membranes. Consequently some machines extract bacteria and very few fungi, protozoa, or nematodes.

(C) The inability to properly clean the machine. Cleaning is serious business for compost tea machines. A bio-film forms on all surfaces contacted by compost teas. With time bio-films become anaerobic producing strong acids in tea and kill plant tissues if applied to them. Circulating pumps and associated plumbing, compost baskets and bags, and air diffusers with frames are easily contaminated and often difficult to clean.

(D) The inability to provide a machine suitable for indoor/kitchen use. Every known machine is too large, awkward, and unappealing for suitable indoor/kitchen use.

(E) The inability to provide a machine which simultaneously suspends, aerates, agitates, and entrains compost in a nutrient water culture.

(F) The inability to provide a machine which separates compost solids from finished compost tea after the brewing process.

(G) The inability to provide a smaller, lower cost machine which reaches a new group of end users.

(H) The inability to provide a machine that tests high in all categories of beneficial organisms.

Several objects and advantages of our invention include:

(A) To provide a greatly simplified machine which operates with aerobic conditions continually in all compost tea contact zones. This is possible by eliminating all circulating pumps and associated plumbing, compost holding baskets or bags, air diffuser frames, and temperature controllers.

(B) To provide a machine which efficiently extracts high numbers of microorganisms by supplying energy directly against microorganisms adhered to compost suspended in a nutrient water culture and releasing microorganisms directly into the compost nutrient-water culture.

(C) To provide a machine which quickly disassembles every part exposed to compost tea for thorough cleaning in a dish washer just as one would wash a cup or plate.

(D) To provide a counter top kitchen appliance type design practical for in home compost tea preparation, use and clean-up. The beaker with holder easily separates from the base and gives a convenient method of pouring finished compost tea into a sprayer.

(E) To provide a machine in which the perforated elastic membrane vibrates and supplies the desired amount and size of air bubbles when receiving a pulsating air supply from a diaphragm pump. This unique vibrating and sparging action simultaneously suspends, agitates, and entrains the compost in a nutrient water culture, greatly enhancing the aeration, extraction, and multiplication of beneficial organisms. The perforated elastic membrane also acts a back flow valve, reducing the number of required parts.

(F) To provide a machine that uses a filtering lid to separate compost solids from finished compost tea. Separation after the brewing cycle eliminates the need for inefficient, often anaerobic compost basket or bag.

(G) To provide a machine which reaches a new group of end users. Especially suited for in home use, where the owner of house plants, patio gardens, window boxes would benefit from an invention that greatly reduces the need for plant care chemicals in the home, apartment, or building.

(H) To provide a machine with excellent beneficial microbial test results.

Further objects and advantages are to provide an air diffuser without a frame The framed or encased chamber is easily contaminated and common to every known air diffuser used to manufacture compost tea machines. The frameless air diffuser or perforated elastic membrane is easily released for proper cleaning by unscrewing the holder from the beaker. To provide a compost tea machine without the need for temperature controllers. Preparing compost tea indoors at room temperatures negates the need for a temperature controller. To provide an instant connect/disconnect air supply system eliminating the need for in line shut off valves, in-line back flow valves, and threaded connectors. Still further objects and advantages will become apparent from consideration of the ensuing description and drawings.

SUMMARY

In accordance with the present invention there is provided an apparatus for simultaneously suspending, extracting, and entraining a compost nutrient water culture, comprising a beaker containing the culture, a perforated elastic membrane transversely covering the open bottom of the beaker, a holder positioned between the beaker and the base, a base containing an air pump supplying air through the holder and against the perforated elastic membrane which releases enough air into the culture to maintain 6 mg per liter through out the brewing cycle. The beaker, holder, and base combine having a general size, and appearance of a counter top kitchen appliance. The beaker, holder, and base engage and disengage easily for the convenient in home preparation of compost tea.

DRAWINGS

Figures

In the drawings, the figures show views, aspects, functions, and desired embodiments of the present invention. The numbers show separate parts and functions FIG. 1 is side view of the compost tea machine.

Figure 1:
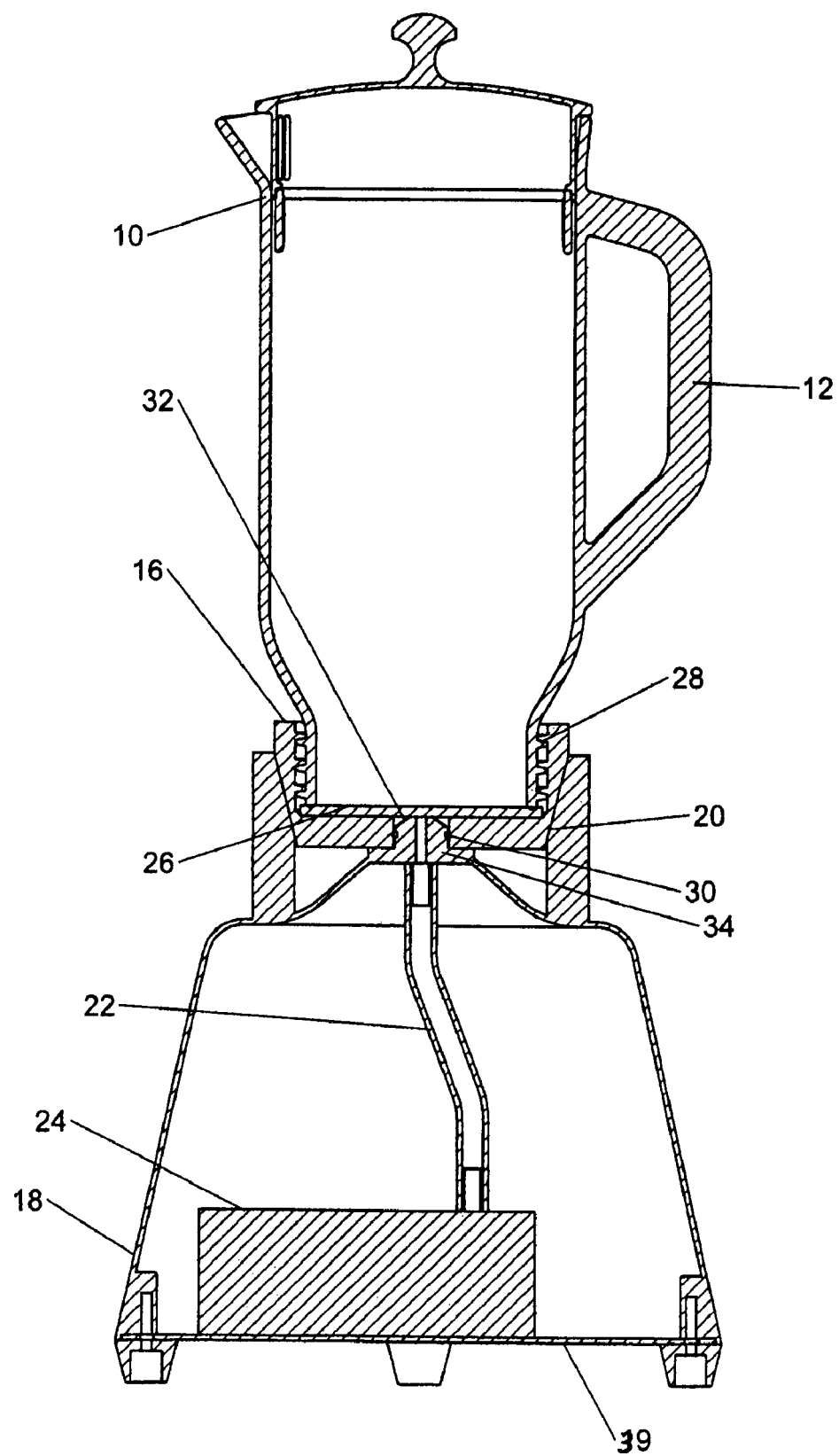

| DRAWINGS-Reference Numerals | |
|---|---|
| 10. | Threaded Beaker |
| 12. | Handle |
| 14. | Holder |
| 16. | Spline |
| 18. | Base |
| 20. | Tapered Recess |
| 22. | Air Tube |
| 24. | Diaphragm Air Pump |
| 26. | Perforated Elastic Membrane |
| 28. | Seat |
| 30. | "O" ring |
| 32. | Passage |
| 34. | Mammilated Air Duct |
| 36. | Lid |
| 38. | Strainer |
| 39. | Base Plate |
| 40. | Break Over Clamps |
| 42. | Disk |
| 44. | Hose Barb |
| 46. | Discharge Valve |
| 48. | Filter |
| 50. | Tank With Threaded Base |
| 52. | Cover |
| 54. | Threaded Lid |
| 58. | Beaker |

DESCRIPTION

Figure 2:
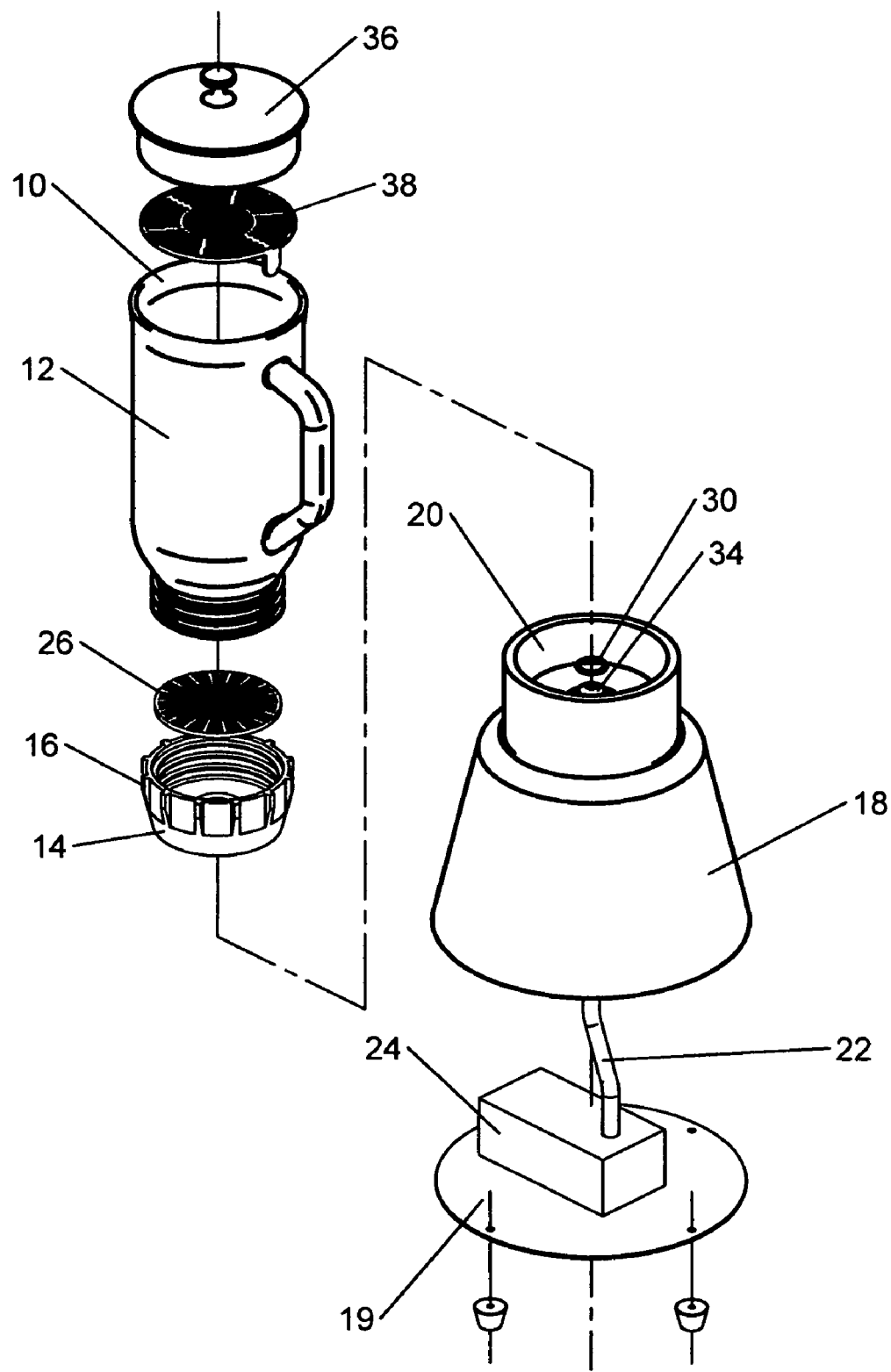
FIG. 2 is an exploded view of the compost tea machine.

A typical embodiment of the compost tea machine is illustrated in FIGS. 1 and 2.

A threaded beaker 10 has an open bottom and a handle 12. In the preferred embodiment threaded beaker 10, has height to bottom diameter ratio of about 3:1, and a top diameter to bottom diameter ratio of about 1.1:1. Threaded beaker 10 may have a height to diameter ratio of about 2:1 to about 5:1, and a top diameter to bottom diameter ratio of about 1:1 to about 3:1. The lower portion of threaded beaker 10 is provided with suitable male threads that are engaged by corresponding female threads in a holder 14, which thus functions as a nut. In the preferred embodiment threaded beaker 10 and holder 14 are a clear thermal plastic polymer that is easily colored, such as a polystyrene, or polycarbonate. However, threaded beaker 10 and holder 14 may be comprised of any other material which maybe formed or molded such as metal, fiberglass or graphite, polypropylene, or polyethylene. An air diffuser or a perforated elastic membrane 26 transversely covers the bottom of threaded beaker 10 and is retained, and compression sealed by tightening holder 14. In the preferred embodiment perforated elastic membrane 26 is latex rubber having a diameter between 2" and 6", having perforations of a size between 0.23 mm and 2 mm, a durometer between 25 and 50, an elasticity between 600% and 900%, a thickness between 0.03" and 0.125", and having a desired number and spacing of perforations proportional to the membrane diameter. Perforated elastic membrane 26 may be comprised of any elastic sheet material such as neoprene, butyl, silicone, or urethane. A ½" to 2" diameter centrally located portion of perforated elastic membrane 26 remains unperforated and acts as a back flow valve when fitted against a seat 28.

Holder 14 is also provided with a plurality of tapered parallel splines 16 protruding from the exterior circumference as on a decorative column. Splines 16 mate positively with a corresponding tapered recess 20, provided by a base 18, there by positioning bottom of holder 14 nearly flush with top surface of tapered recess 20. Base 18 contains a diaphragm air pump 24 which supplies air through an air tube 22, and into a mammilated air duct 34. In the preferred embodiment the air supply is diaphragm air pump 24 which provides a pulsating air supply, however, the pump may also be a rotary, vane, or piston type air pump. Mammilated air duct 34, fitted with a horizontal "O" ring 30, is positioned centrally on the top surface of tapered recess 20. Mammilated air duct 34 protrudes upward into a passage 32 provided by holder 14, forming an air tight seal between "O" ring 30 and passage 32. A base plate 39 supports diaphragm air pump in base 18. A lid 32 contains a strainer 38. In the preferred embodiment strainer 38 is a stainless steel wire filtering medium having a mesh size between 80 mesh and 120 mesh. Strainer 38 may comprise any material inert to microbial decomposition such as plastics, nylon, silk and fine weave cotton.

Although the present invention has been described with reference to preferred embodiments, workers skilled in the art will recognize that changes may be made in form and detail without departing from the spirit and scope of the invention.

Operation—FIGS. 1 and 2.

To operate this version of the invention lid 36, with strainer 38 are removed from threaded beaker 10. The desired amount of compost nutrient water culture is introduced into threaded beaker 10. Lid 36, with strainer 38 are fitted into the top of threaded beaker 10. Diaphragm Air pump 22 is activated by plugging into standard household electric outlet. Pulsating pressurized air from the diaphragm air pump 22 passes into air tube 22, through mammilated air duct 34, into passage 32. In passage 32 pulsating air pressure overcomes hydrostatic pressure of compost nutrient water culture contained in threaded beaker 10, vibrating and stretching perforated elastic membrane 26, and sparging air into the culture contained in threaded beaker 10 for approximately twelve to twenty four hours. The combination of vibrating perforated elastic membrane 26, air bubble movement through the culture, and shape of threaded beaker 10 simultaneously suspends, agitates, and entrains the culture greatly multiplying the number of beneficial organisms. Suspension of the compost nutrient water culture upon vibrating perforated elastic membrane 26 assures full aeration without settling of particles in lower portions of threaded beaker 10. Agitation of the compost nutrient water culture efficiently extracts microorganisms adhered to compost directly into the compost, water nutrient culture. Entraining the compost nutrient water culture introduces the extracted microorganisms into an enriched environment of aerated water and nutrients conductive to rapid reproduction. When the desired time elapsed diaphragm air pump 22 is deactivated. Immediately, the hydrostatic pressure in threaded beaker 10 overcomes air pressure upon perforated elastic membrane 26 depressing unperforated portion of perforated elastic membrane 26 upon seat 28, acting as a back flow valve. Then lift threaded beaker 10 by handle 11 from base 14 and pour brewed compost tea through strainer 38 in lid 36 into desired dispenser. To clean the compost tea machine, remove Lid 36 with strainer 38 from threaded beaker 10, disengage holder 14 from threaded beaker 10, and remove perforated elastic membrane 26. Place Lid 36 with strainer 38, Threaded beaker 10, Holder 14, and perforated elastic membrane 26 in dish washer using a mild detergent or use other cleaning means to remove surface bio-solids.

Figure 3:
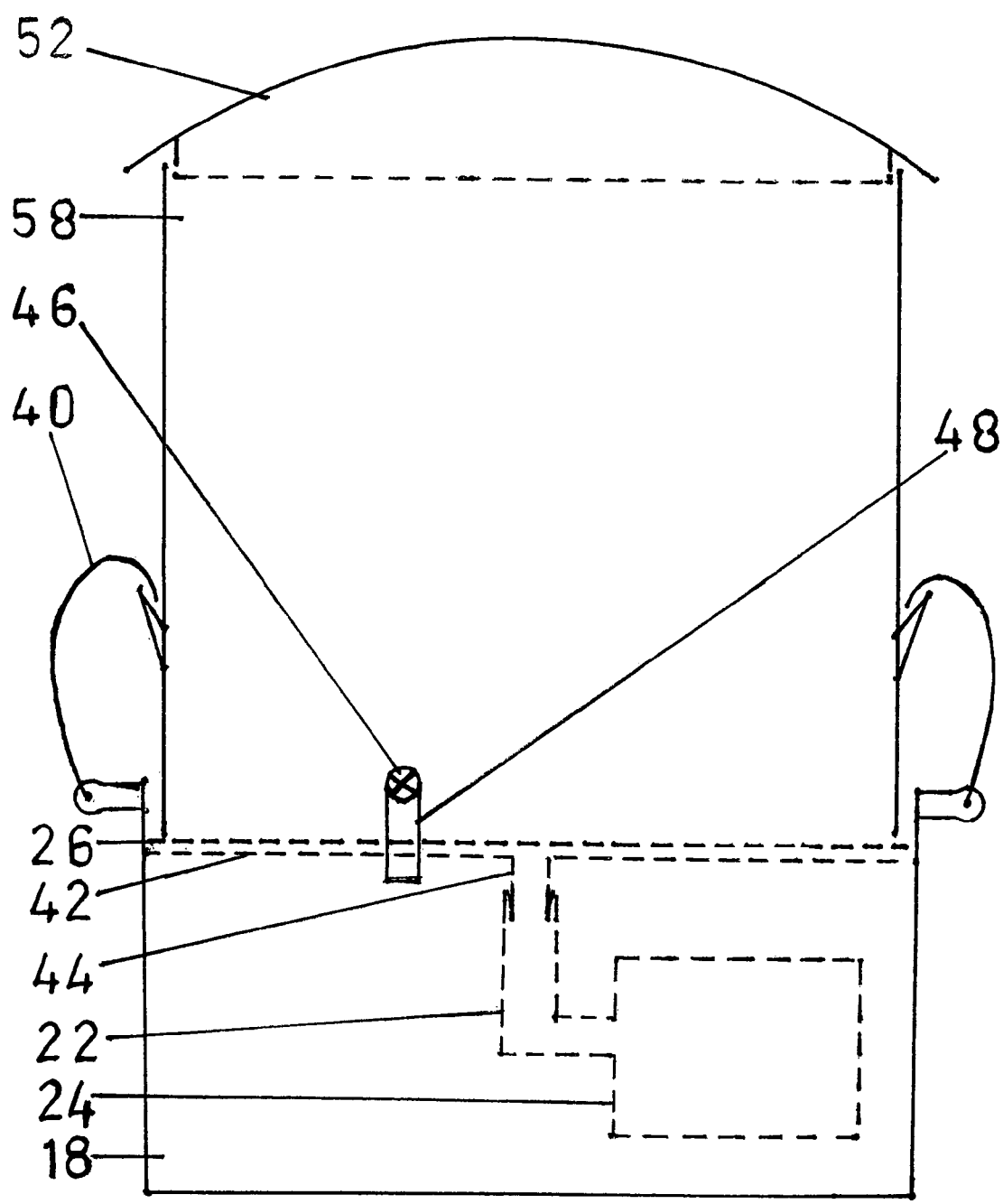
FIG. 3 is a side view of another embodiment having break over clamps.
Figure 4:
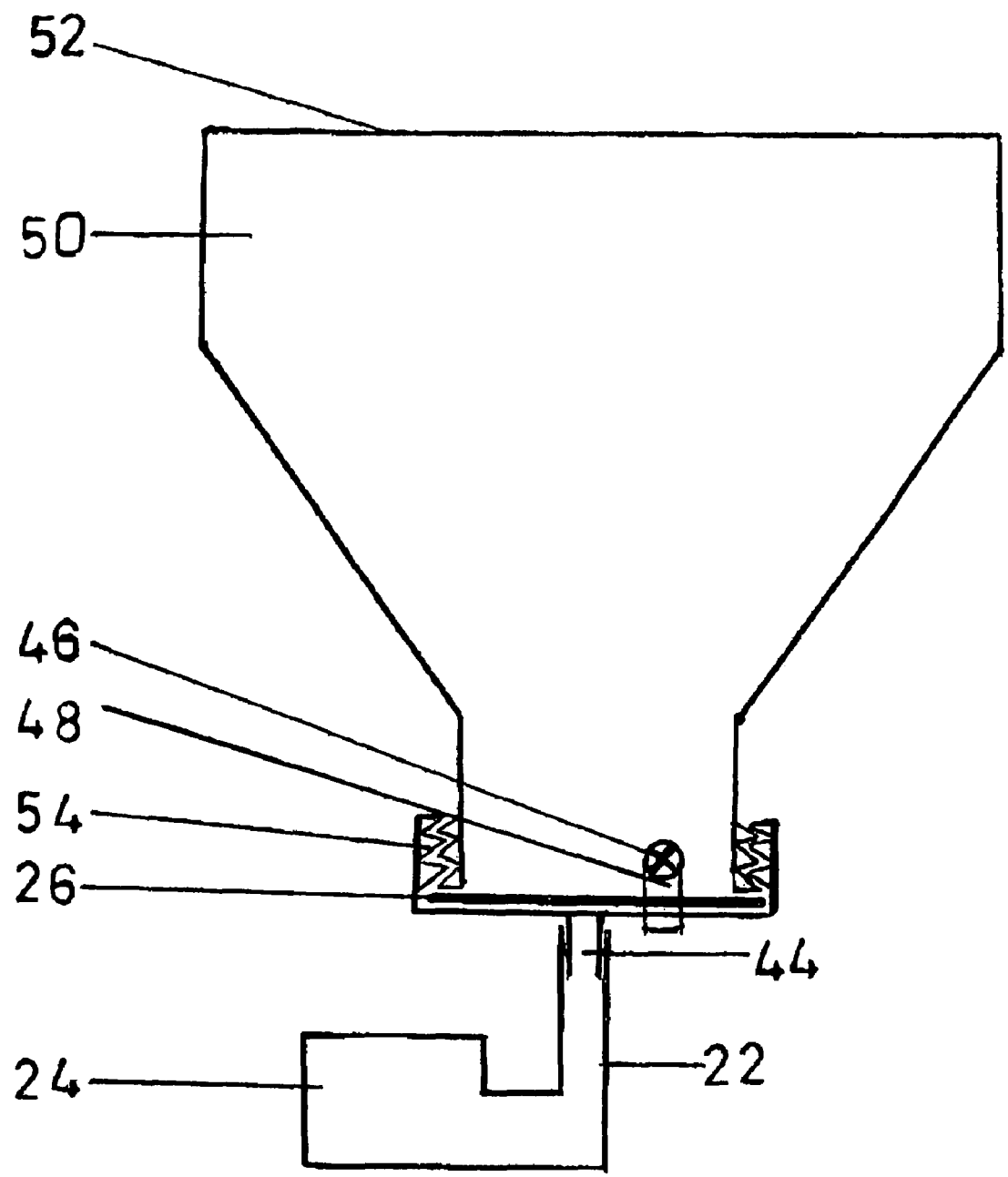
FIG. 4 is a side view of another larger embodiment having a threaded base.

FIGS. 3 and 4 ADDITIONAL EMBODIMENTS

Additional embodiments are shown in FIGS. 3 and 4. In FIG. 3 a plurality of break over clamps 40 pull a beaker 58 and base 18 together compression sealing perforated elastic membrane 26 between bottom of beaker 58 and top of a disk 42.

In FIG. 4 a tank with threaded base 50 has a cover 52 and a threaded lid 54. Perforated elastic membrane 26 transversely covers tank with threaded base 50. Diaphragm Air pump 24 supplies air through air tube 22 and into a hose barb 44. Threaded lid 54 compression seals perforated elastic membrane 26 between tank with threaded base 50 and threaded lid 54. A discharge valve 46 is fitted with a filter 48. This alternative embodiment represents a larger version of our invention comprising sizes between about 5 gallon to 500 gallon.

Operation—FIGS. 3 and 4.

The operation of the additional embodiment of FIG. 3 is nearly the same as the preferred embodiment. The operating changes are that pressurized pulsating air from the diaphragm air pump 24 passes into air tube 22, through hose barb 44 and then overcomes hydrostatic pressure of culture contained in beaker 58. The pressurized pulsating air is then sparged through perforated elastic membrane 26 and into culture contained in beaker 58. To clean this additional embodiment remove lid 36 with strainer 38 from top of beaker 58, disengage break over clamps 40 separating beaker 58 from base 18, and remove perforated elastic membrane 26. Place lid 36 with strainer 38, beaker 58, and perforated elastic membrane 26 in dish washer or use other cleaning method.

Operation—FIG. 4

The operation of the additional embodiment of FIG. 4 is nearly the same as the preferred embodiment. The operating changes are to remove cover 52 from top of tank with threaded base 50 and introduce the desired amount of compost, nutrient water culture into tank with threaded base 50. Pressured air from diaphragm air pump 24 passes through air tube 22 and into hose barb 44. Air pressure in hose barb 44 overcomes hydrostatic pressure of compost, nutrient water culture in tank with threaded base 50 and sparges air through perforated elastic membrane 26 and into compost, nutrient water culture contained in tank with threaded base 50. To remove brewed tea from tank 50 open discharge valve 46 and brewed tea flows through filter 48 and into desired sprayer or container. To clean, unscrew threaded lid 54, remove perforated elastic membrane 26, and clean tank with threaded base 50, threaded lid 54, and perforated elastic membrane 26.

Advantages:

From the description above, a number of advantages of our compost tea machine become evident:

(A) Our invention eliminates the need for all circulating pumps and associated plumbing, compost holding baskets or bags, air diffuser frames, and temperature controllers.

These parts interact with the compost tea culture and often contribute to anaerobic conditions.

(B) The unique design efficiently extracts high numbers of microorganisms by supplying energy directly against microorganisms adhered to compost suspended in a nutrient water culture. Microorganisms are extracted directly into the compost, nutrient water culture. All other known commercial compost tea machines supply energy against a basket or bag which greatly restricts microorganism extraction, especially in centrally located portions of basket or bag.

(C) The ability to mass produce a smaller machine with fewer parts translates into a lower cost machine affordable by a larger customer base.

(D) A lifting the beaker by the handle easily separates the beaker with holder from the base, and gives a convenient method of pouring finished compost into the desired dispenser. The attractive design is appropriate for a counter top kitchen appliance.

(E) The perforated elastic membrane vibrates and supplies the desired amount and size of air bubbles when receiving an air supply from a diaphragm pump. This unique, vibrating and sparging action simultaneously suspends, agitates, and entrains the compost in a nutrient water culture greatly enhancing the aeration, extraction, and multiplication of beneficial organisms. The combination of a vibrating perforated elastic membrane, air bubbles sparging into the compost nutrient water culture, and the beaker shape eliminate anaerobic zones and suspend all of the culture above the vibrating perforated elastic membrane. Our invention is so efficient that the brewing time is reduced by 50% compared to other compost tea machines, also, our invention requires only one half the amount of compost as other compost tea machines. The perforated elastic membrane also acts a back flow valve retaining the compost nutrient water culture in the beaker, and eliminating the need for an in line back flow valve.

(F) This invention uses a filtering lid to separate compost solids from finished compost tea. Separation after the brewing cycle eliminates the need for inefficient, often anaerobic compost baskets or bags.

(G) Our invention quickly disassembles every part exposed to compost tea for cleaning in a dishwasher, as one would wash a cup or plate.

(H) The combination of a perforated, elastic membrane acting as a back flow valve and an instant air connect/disconnect, permit the beaker with holder to contain a culture and be connected or disconnected from the base without leaking or spilling any of the culture.

(I) Presently, many homes, offices and apartments maintain indoor plants with chemical fertilizers and pesticides. The present invention provides an organic, non-chemical option, and, therefore, reaches a new group of end users.

Further objects and advantages are to provide an air diffuser without a frame, which eliminates the encased or framed chamber. The framed chamber is easily contaminated and common to every known air diffuser. The frameless air diffuser or perforated, elastic membrane is easily released for proper cleaning by disengaging the holder. To provide a compost tea machine without the need for temperature controllers. To provide an instant connect/disconnect air supply. This unique device eliminates the need for in-line shut of valves, in-line back flow valves, and threaded connections.

We claim:

1. An apparatus for simultaneously suspending, agitating, and entraining a compost nutrient water culture, comprising:

a beaker having a predetermined cross-sectional shape for containing said compost nutrient water culture, an open top and an open bottom;

a lid and strainer covering said open top;

a vibrating perforated elastic membrane transversely covering the open bottom of said beaker;

a holder for compression sealing of said membrane on the open bottom of said beaker;

a base containing an air pump, wherein the holder mates with the base so as to provide fluid communication between the air pump and the bottom side of said membrane and wherein air provided by said air pump against said bottom of said membrane, overcomes hydrostatic pressure of said compost nutrient water in said beaker thereby sparging enough air through said perforated membrane and into said compost nutrient water culture to maintain 6 mg of oxygen per liter through out a brewing cycle; and said base and holder including means for quick connect/disconnect of said fluid communication between said air pump and said bottom side of said membrane.

2. The apparatus of claim 1, wherein the beaker shape, said membrane and air pump are constructed so as to suspend said compost nutrient water culture assuring full aeration above 6 mg oxygen per liter without settling of particles in lower portions of said beaker.

3. The apparatus of claim 1, wherein the beaker shape, said membrane and air pump are so constructed so as to agitate the compost nutrient water culture to extract adhered microorganisms directly into said compost nutrient water culture.

4. The apparatus of claim 1, wherein the beaker shape, said membrane and air pump are constructed so as to entrain said compost nutrient water culture where by the reproduction of microorganisms is enhanced.

5. The apparatus of claim 1, wherein the lower portion of the beaker includes male threads that are engaged by corresponding female threads in said holder.

6. The apparatus of claim 5, wherein said membrane transversely covers the bottom end of the beaker and is compression sealed by tightening said holder.

7. The apparatus of claim 6, wherein said holder includes a seat and said membrane has a centrally located portion without perforations acting as a back flow valve when fitted against said seat.

8. The apparatus of claim 1, wherein said holder is provided with multiple parallel splines protruding from an exterior circumference and said splines mate positively with a corresponding tapered recess in said base.

9. The apparatus of claim 1, wherein said means for quick connect/disconnect includes a passage in said holder and a mammilated air duct in said base, said air duct including an "O"-ring for forming an air-tight seal between said air duct and said passage.

10. The apparatus of claim 1, wherein said beaker, said holder and said base are separable to facilitate cleaning of the apparatus.

11. The apparatus of claim 1, wherein the strainer has a mesh size between 80 mesh and 120 mesh.

* * * * *